(12) United States Patent
Gassmann

(10) Patent No.: US 6,428,439 B1
(45) Date of Patent: Aug. 6, 2002

(54) INTEGRATED VISCOUS TRANSMISSION IN A DIFFERENTIAL

(75) Inventor: Theodor Gassmann, Rochester, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 7 days.

(21) Appl. No.: 09/678,718

(22) Filed: Oct. 4, 2000

(51) Int. Cl.[7] ............................................. F16H 48/00
(52) U.S. Cl. ............................. 475/84; 475/87; 475/89; 180/248
(58) Field of Search ............................ 475/84, 87, 89, 475/243, 231; 180/248

(56) References Cited

U.S. PATENT DOCUMENTS

| | | | | |
|---|---|---|---|---|
| 4,914,980 A | * | 4/1990 | Taureg et al. | 475/89 |
| 5,149,309 A | * | 9/1992 | Guimbretiere | 475/234 |
| 5,168,956 A | * | 12/1992 | Namioka | 180/248 |
| 5,533,424 A | * | 7/1996 | Mimura | 74/650 |
| 6,296,590 B1 | * | 10/2001 | Gassman | 475/231 |

* cited by examiner

*Primary Examiner*—Sherry Estremsky
*Assistant Examiner*—Eric M. Williams
(74) *Attorney, Agent, or Firm*—Mick A. Nylander

(57) ABSTRACT

A differential drive for use on a vehicle to control the transfer of torque between the front and rear axles of a vehicle. The differential drive includes a rotatably driven differential housing supported in a housing. The differential drive also includes a differential gear set arranged and supporting in the differential housing. The differential gear set has at least two side shafts gears and at least two differential gears. The differential drive also includes a torque distribution device having a viscous transmission. The viscous transmission has an inner hub and an outer casing. The inner hub is connected to a first side shaft. The outer casing is connected to one of the side gears. The viscous transmission also connects the output of the first side shaft to one of the side shaft gears.

8 Claims, 4 Drawing Sheets

INTEGRATED VISCOUS TRANSMISSION IN A DIFFERENTIAL

TECHNICAL FIELD

The present invention relates to differential drives for a motor vehicle, and more particularly, relates to a speed sensing torque transfer device for use in a vehicle.

BACKGROUND ART

The differential drive is well known in the motor vehicle industry. The differential drive is used in conjunction with the transmission and drive shaft or propeller shaft (prop shaft) to turn the automotive vehicle wheels at different speeds when the vehicle is going around a curve, to differentiate the speed of each wheel individually and to provide the proper amount of torque to each wheel in slipping, turning or other road to wheel conditions.

In a traditional torque on demand drive train layout of an automotive vehicle, there is a primary driven front/rear axle and a secondary driven hang-on axle that is connected via prop shaft or drive shaft and a torque transferring coupling to the primary driven axle. The torque transfer coupling is usually directly in front of the secondary driven axle. The axle differential creates the division of power or torque to each side shaft of the axle. The primary driven axle also includes a differential which divides the necessary power to the side shaft of each front axle and then the wheels. The division of torque between the front and rear axle is completed by the torque transfer coupling which is a separate unit on the drive train system and requires spacing for its housing and other related parts. A current state-of-the-art passive torque transfer coupling for an automotive vehicle is located between the primary and secondary driven axles of the vehicle and can generally consist of a viscous coupling, gear rotor coupling, or any other passive speed sensing device. The viscous coupling unit senses slip conditions of the wheels, monitors current driving conditions of the vehicle and distributes torque to each wheel or axle as necessary.

A passive torque transfer system provides flexibility in the distribution of torque between the axles in an all-wheel or four-wheel drive automotive system. Generally, a passive speed sensing device will provide traction control through a smooth and progressive torque transfer to the wheel or axle with the greatest traction potential. The viscous coupling is a well known passive speed sensing device that operates according to principles of fluid friction and thus is dependent on speed differences. Furthermore, the viscous coupling has great flexibility in its design parameters thus allowing it to achieve desired torque characteristics with relation to traction and handling. The viscous coupling is a self contained unit that does not need electronics or remote sensors to operate. All of these passive speed sensing torque drive systems are located in a separate housing usually directly in front of the rear differential.

Therefore, there is a need in the art for a device to simplify, reduce the weight and required space of a passive speed sensing torque distribution device for use in an automotive vehicle.

DISCLOSURE OF THE INVENTION

One object of the present invention is to provide an improved torque distribution device. Another object of the present invention is to provide a torque distribution device that includes a viscous transmission that runs at axle speed, which will reduce imbalance issues in the transaxle.

Yet a further object of the present invention is to reduce and minimize the packaging requirements in the prop shaft area of the automotive vehicle.

Still another object of the present invention is to provide a differential that includes a viscous transmission that runs in oil and also reduces the effort for bearings and seals while improving the cooling of the differential.

A further object of the present invention is to reduce the number of interfaces in the drive train while also reducing the weight and cost of the drive train assembly.

Still a further object of the present invention is to integrate within the existing axle housing the viscous transmission to control the torque between the front and rear axles.

To achieve the foregoing objects the differential drive for use on a vehicle includes a rotatably driven differential housing supported in a housing. A differential gear set arranged and supporting in the differential housing. The differential gear set including at least two side shaft gears and at least two side gears. A torque distribution device having a viscous transmission. The viscous transmission having an inner hub and an outer casing. The inner hub being connected to a first side shaft. The viscous transmission also includes an outer casing that is connected to one of the side shaft gears. The viscous transmission connects the output of the first side shaft to one of the side shaft gears.

One advantage of the present invention is a new and improved torque distribution device for a vehicle.

A further advantage of the present invention is that the torque distribution device uses a viscous transmission that runs at axle speed which reduces imbalance issues on the drive train.

A further advantage of the present invention is the reduced or minimized packaging requirement in the prop shaft area of the motor vehicle.

Yet a further advantage of the present invention is the inclusion of the viscous transmission that runs in oil to reduce the effort for bearings and seals while also improving the cooling within the differential.

A further advantage of the present invention is to reduce the number of interfaces and reduce the weight and costs of distributing torque to the drive train system.

A further advantage of the present invention is the integration within the housing of the viscous transmission for the torque distribution device.

Other objects, features, and advantages of the present invention will become apparent from the subsequent description and appended claims taken in conjunction with the accompanying drawings.

BEST MODE OF CARRYING OUT THE INVENTION

Figure 1:
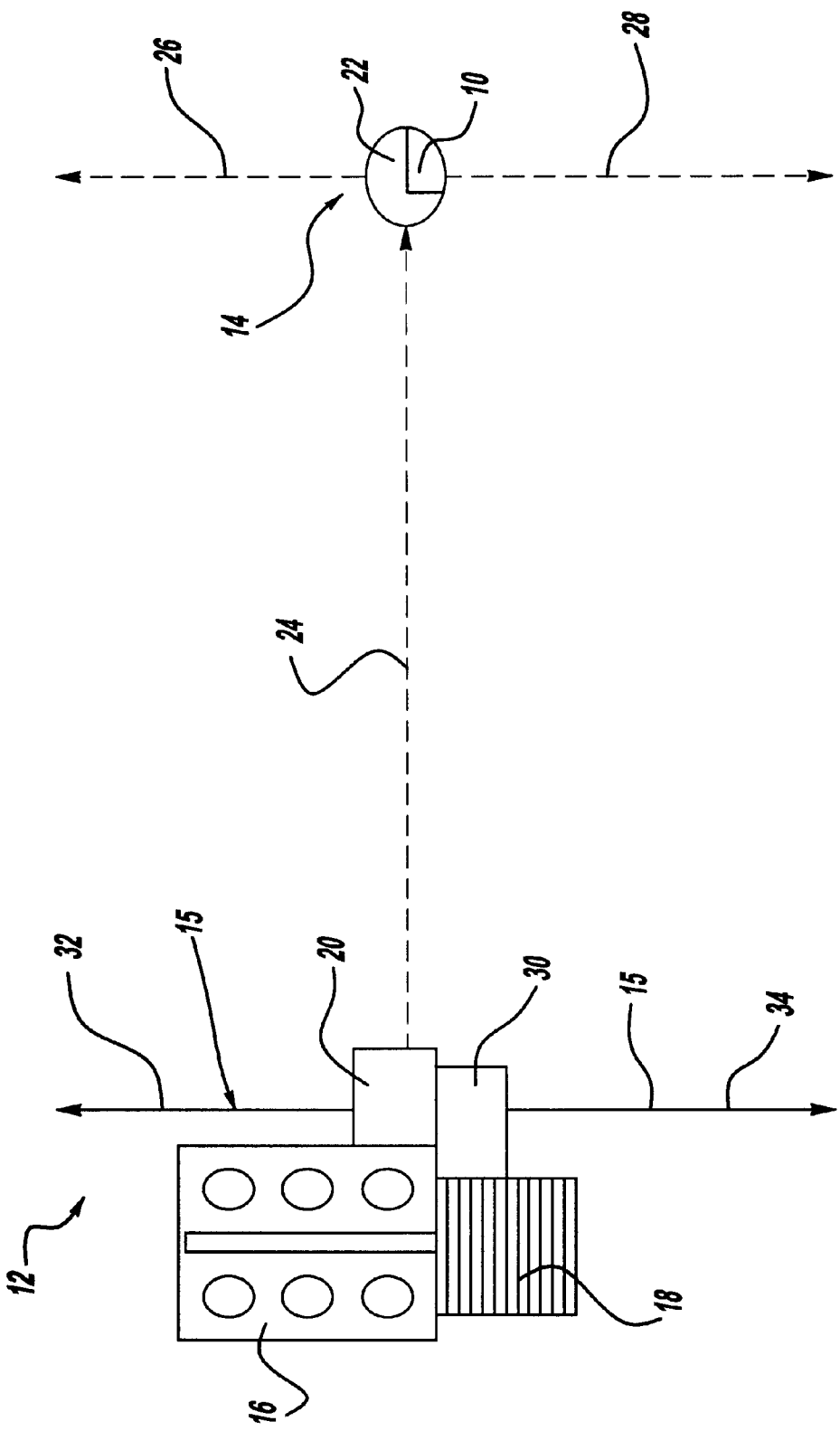
FIG. 1 shows a schematic view of a vehicle system according to the present invention.
Figure 4:
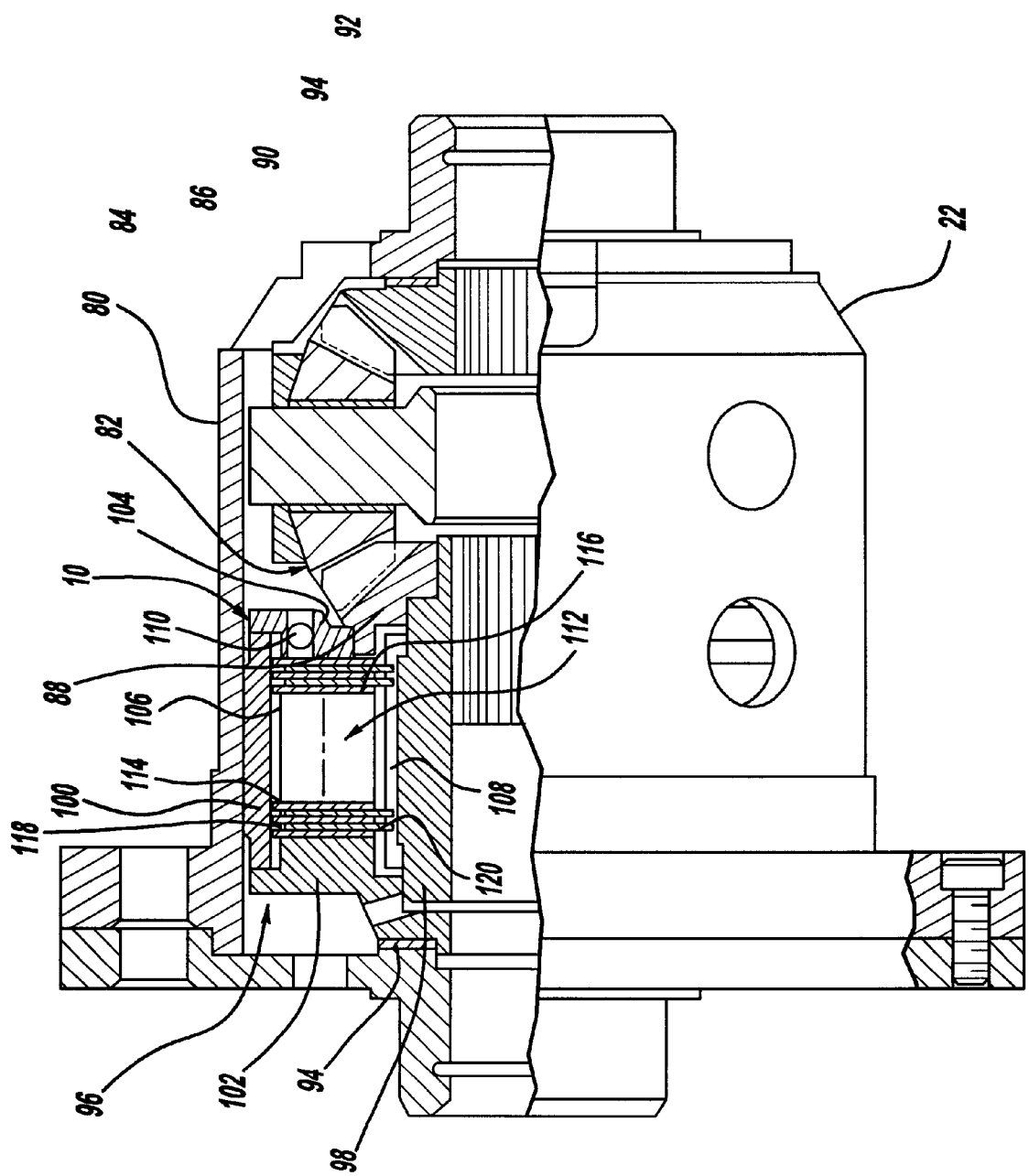
FIG. 4 shows a cross section of a differential drive according to the present invention.

As shown in FIG. 4, there is a torque distribution device 10 according to the present invention. FIG. 1 schematically illustrates an all wheel drive or four wheel drive motor vehicle that is a primary front wheel driven vehicle, however, the present invention can also be used on a primary rear wheel drive driven vehicle as well.

The motor vehicle 12 as shown in FIG. 1 is primarily driven by a front axle system 15. The motor vehicle 12 is an all wheel drive or four wheel drive vehicle and is driven by power transferred from the engine 16 through a transaxle or gear box 18, which may be either automatic or a manual gear box. The power from the gear box 18 enters the power takeoff 20 of the drive train assembly and finally on through to the front differential 30. When there is a demand for power, power is transferred to the rear differential 22 via a propeller shaft or driving shaft 24. At the rear differential 22 power splits to a left rear side shaft 28 and a right rear side shaft 26 for distribution to the wheels at the rear of the vehicle 12. The front differential 30 controls power and slip or spin from the left front side shaft 34 and the right front side shaft 32. In an all wheel drive vehicle, power is delivered to both the rear differential 22 and front differential 30 via a distributing drive, but either the front axle system 15 or the rear axle system 14 is a primarily driven axle, with the other axle only receiving power when needed. The preferred embodiment of the present invention is an all-wheel drive vehicle wherein the torque distribution device 10 is located within the rear differential 22 and operates from there to distribute torque to the front and rear axles of the vehicle 12.

Figure 2:
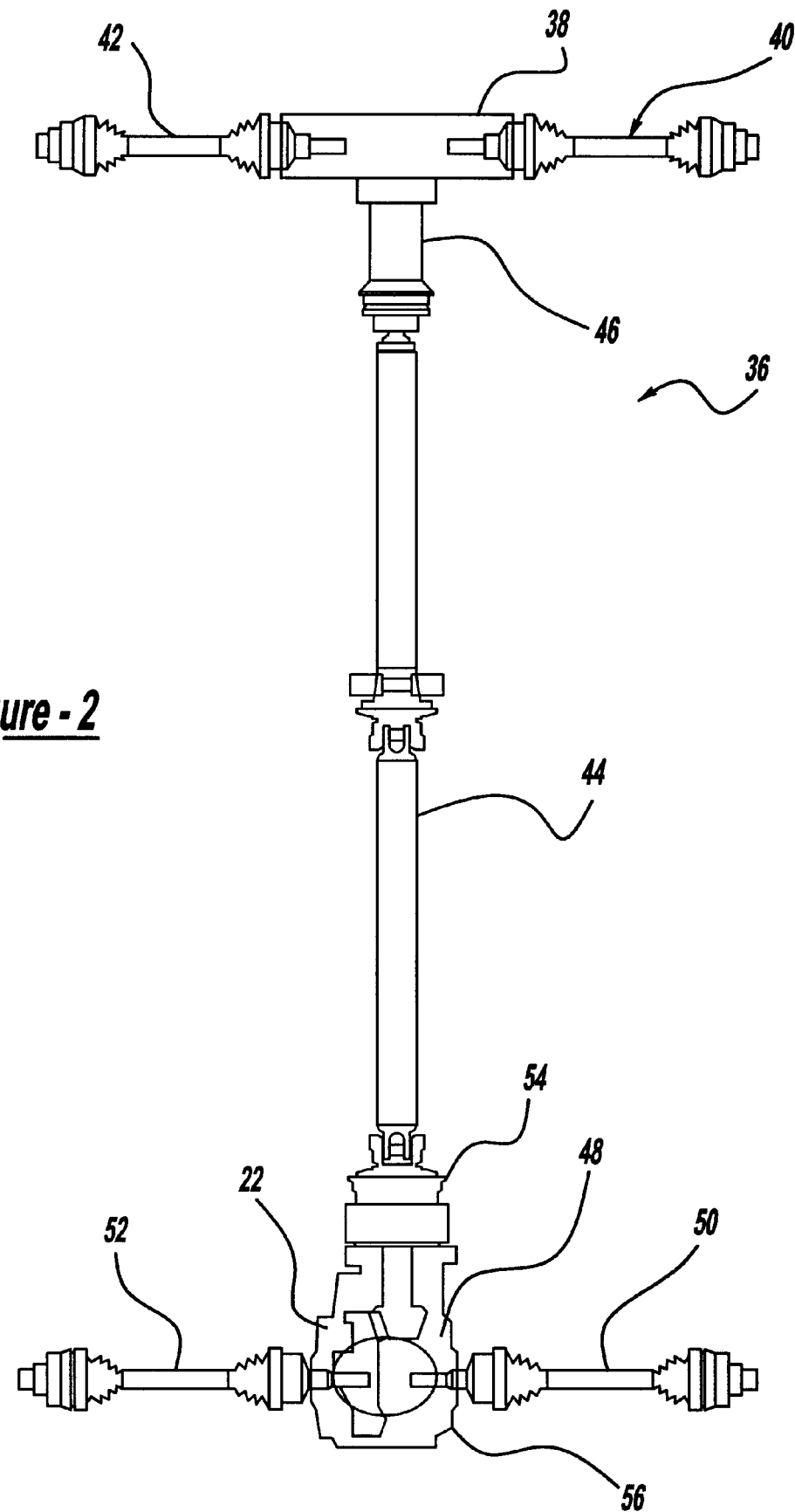
FIG. 2 shows a schematic view of a prior art vehicle drive train system.

FIG. 2 shows the drive train 36 of a prior art vehicle. The drive train 36 includes a front axle system 38 which includes a right front side shaft 40 and a left front side shaft 42. A propeller shaft or drive shaft 44 transmits the power from the power takeoff 46 to the rear differential 48. The rear differential 48 has a right rear side shaft 50 and a left rear side shaft 52 extending therefrom to the vehicle wheels which will propel the vehicle in a forward or reverse motion. The propeller shaft 44 is connected to the torque coupling housing 54 which is in front of the rear differential 48 in the prior art system. The torque coupling housing 54 then connects to the rear differential drive which includes an axle housing 56 in which a differential housing is rotatably supported around a rotation axis. The differential housing is driven by the vehicle gear box via a driving gear. As noted the torque coupling housing 54 is located outside and in front of the rear differential 22 in the prior art all wheel drive system. The torque coupling runs at prop shaft torque and prop shaft speed which sometimes complicates packaging issues for the automotive designer. The packaging requires a large separate housing to hold the torque coupling which requires more material and is a more expensive mounted torque coupling when it is externally mounted in front of the rear differential 48.

Figure 3:
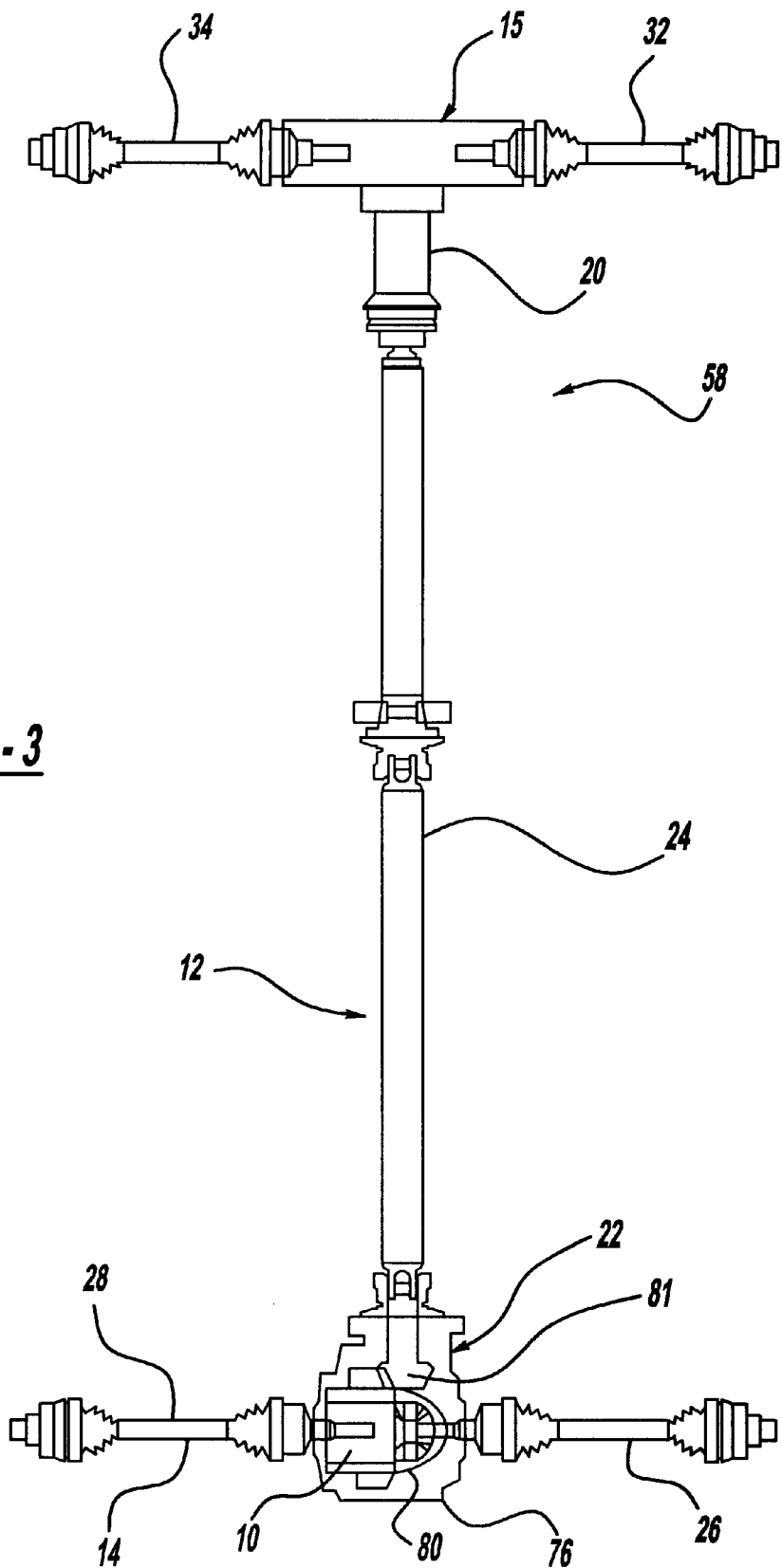
FIG. 3 shows a schematic view of a vehicle drive train system according to the present invention.

FIG. 3 shows a drive train 58 of an all wheel drive vehicle 12 according to the present invention. The drive train 58 includes a front axle system 15 which includes a right front side shaft 32 and a left front side shaft 34. A propeller shaft or drive shaft 24 transmits power from the power take off 20 to the rear differential 22. The rear differential 22 has a right rear side shaft 26 and the left rear side shaft 28 extending therefrom to the vehicle wheels which will drive the vehicle in a forward or reverse motion. The rear differential drive 22 includes an axle housing 76 in which a differential housing 80 is rotatably supported around a rotational axis. The differential housing 80 is driven by the vehicle gear box via a driving gear 81. The torque distribution device 10 of the current invention is located within the differential housing 80 and is used to transfer torque between the front axle system 15 and the rear axle system 14 as shown. The use of the torque distribution device 10 within the differential drive 22 in conjunction with an open differential will reduce the weight and cost of the vehicle by removing the need for a separate torque transfer coupling or viscous transmission, which is usually located directly in front of the rear differential drive 22. The incorporation of the torque transfer device 10 within the differential drive 22 greatly reduces the space required on the undercarriage of the vehicle leaving more space for exhaust and fuel tank needs. Furthermore, it reduces any noise, vibration and harshness issues associated with having a separate housing mounted in front of the rear differential 22.

FIG. 3 shows a rear differential 22 which includes the axle housing 76 which rotatably supports the differential housing 80 around a rotational axis. FIG. 4 shows the differential housing 80. The differential housing 80 includes a differential gear set 82 that is rotatably arranged and supported therein. In the preferred embodiment, the differential gear set 82 is a standard bevel or planetary set. The gear set 82 generally includes two differential bevel gears or differential gears 84 that are rotatably arranged on a bearing pin 86 whose axis forms a rotational axis for the two differential bevel gears 84. The rotational axis for the differential bevel gears 84 will intersect the rotational axis for the differential side shaft gears 88 and 90 within the differential housing 80. Differential side shaft gears 88 and 90 are arranged around a rotational axis as to be rotatable relative to the differential housing 80. Differential side shaft gears 88 and 90 are rotatably received in bores 92 of the differential housing 80. Differential side shaft gears or side shaft gears 88 and 90 are supported against the inner face of the differential housing 80 with supporting disks 94 arranged therebetween. The axis of rotation of the side shaft gears 88 and 90 and the axis of rotation of the differential gears 84 intersect each other at a right angle. As shown in FIG. 3, the propeller or drive shaft 24 engages the differential housing 80 via a driving gear 81.

The torque distribution device 10 is located within the differential housing 80 and engages the differential gear set 82. The torque distribution device 10 will connect one of the differential side shaft gears 88 with one of the side shafts 28. The torque distribution device 10 includes a passive speed sensing device which in the preferred embodiment is a viscous transmission 96 as shown in FIG. 4. It should be noted that any other type of passive speed sensing device can be used such as a gear rotor pump, clutch pack and shear pump, etc. The viscous transmission 96 includes an inner hub 98 and an outer casing 100. The outer casing 100 includes two walls 102, 104 on each end thereof. The outer casing 100 also includes on an inner surface a plurality of teeth 106. The inner hub 98 of the viscous transmission includes a plurality of teeth 108 on its inner surface. The inner hub 98 is connected on a side opposite teeth 108 to the side shaft 28 of the rear differential 22. The viscous transmission 96 also includes on one wall thereof a seal 110 to keep the viscous fluid within the viscous transmission chamber 112 which is formed by the two walls of the outer casing 100 and inner hub 98. Extending within the operating chamber 112 of the viscous transmission 96 are outer plates 114 and inner plates 116 which are arranged in a certain sequence along the longitudinal axis of the viscous transmission 96. The outer plates 114 are associated with the viscous outer casing 100 and engage the teeth 106 of the outer casing of the viscous transmission 96. Spacing rings 118 will space the outer plates 114 relative to one another and relative to the viscous transmission outer casing 100. The inner plates 116 are arranged between the outer plates 114. The inner plates 116 include circumferentially distributed teeth 120 which clip on to and engage the teeth 108 located on the inner hub 98. The inner plates 116 are movable along the longitudinal axis of the viscous transmission 96.

The operating chamber 112 of the viscous transmission 96 is partially filled with a viscous fluid, for example, a highly viscous silicone oil. If a speed differential occurs between the inner hub 98 and the outer casing 100 of the viscous transmission 96, a speed difference will also occur between the outer plates 114 and the inner plates 116 of the viscous transmission. Any speed difference that is sensed between the inner and outer plates 116, 114 will create a viscous shear within the viscous transmission and thus transfer torque while in the normal operating viscous mode. As the shearing force of the viscous fluid increases the inner and outer plates 114, 116 interact with one another forcing the inner hub 98 to spin at the speed of the side gear 88 which is connected to the outer casing 100 of the viscous transmission 96. This increases the power or torque to the side shaft 28 and the side shaft 26 via the open differential. Thus, torque will be transferred to the rear wheels of the vehicle during a slip condition of the front primary driven wheels.

In operation the differential gear set 82 takes the speed difference between the front and rear axle 15, 14 and between the left and right hand wheels of the secondary driven rear axle at the same time. This all occurs while the viscous transmission 96 is running at the same speed as the axle speed and providing the torque transfer to one of the side shafts and then onto a wheel.

The second side shaft gear 90, connected side shaft 26 and wheel is then driven with the same torque via the open differential. Therefore, the differential 22 is an open differential between the left and right side shafts 26, 28 of the rear axle 14 allowing the wheels to spin freely in a turn. The torque distribution device 10, as described, above controls the slip between the front and rear axles 14, 15 of the automotive vehicle by controlling one of the side shafts 28 of the secondary driven axle 14. This removes the need for a separate torque transfer coupling which is generally located directly in front of the prop shaft usually in front of the rear differential.

When a spin condition affects the front wheels, the front wheels rotate the prop shaft faster which will rotate the differential housing 80 faster which in turn will rotate the differential gear set and consequently the side gear 88 faster. The increase in the rotational velocity at the side gear 88 will cause the outer casing 100 of the viscous transmission 96 to rotate faster along with the connected outer plates 114. The rotation of the outer plates 114 will create a shearing effect within the viscous fluid of the viscous transmission 96. This interaction of the inner and outer plates 116, 114 of the viscous transmission, via the viscous shear, will create greater torque and rotation of the inner hub 98 of the viscous transmission 96 which will pass that greater torque and speed to side shaft 28 thus providing torque and spinning power to the rear wheels over the open differential, when the front wheels are in a spin condition. When the spin condition is over, the front wheels will grip the surface of the road thus sending less torque through the prop shaft 24 to the rear differential 22, hence slowing down the velocity sent to the rear differential 22 and in turn slowing down the rotation of the differential housing 80 until an equilibrium is reached and the viscous transmission fluid reaches an equilibrium. This equilibrium will reduce the torque being passed through the inner and outer plates 114, 116 to the side shaft 28 of the rear axle. The equilibrium will allow for free rotation of the rear side shafts at the equilibrium point and not deliver any torque to the rear wheels. Therefore, any speed difference between the front and rear axles 14, 15 will cause a slip speed difference across the viscous transmission 96 and generate torque or power to the rear wheels. The slip speed across the viscous transmission 96 is generally twice the speed difference between the front and rear axle differential case.

The new improved torque distribution device 10 as described above creates several advantages over the prior art including the viscous transmission 96 running with and at axle speed which will reduce the imbalance issues within the drive train system. The minimized packaging requirements of the prop shaft area also increases room needed for exhaust and fuel tank purposes. The torque distribution device 10 also reduces the effort needed for bearings and seals by being incorporated into the differential housing 80. The differential oil also will improve cooling of the torque distribution device 10. The combination and inclusion of the torque distribution device 10 within the differential drive also reduces the number of interfaces needed from the differential drive 22 to the power distribution portion of the drive train assembly. Furthermore, there is a reduction in weight because the torque transfer coupling housing is no longer necessary and this also reduces costs by tooling fewer parts.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An improved torque transmission device for use on a vehicle drive train system having an engine, a transaxle, a front and a rear differential, a propeller shaft connecting the front and rear differential, a right and left side shaft extending from each of the front and rear differentials, said improved torque distribution device including:

a differential gear set located within the rear differential, the torque distribution device engages with said differential gear set; and the torque distribution device including a viscous transmission engaged with one of a side shaft and one of a side shaft gear of said differential gear set, said viscous transmission runs with an axle speed and provides torque transfer between said front and rear differentials.

2. The torque distribution device of claim 1 wherein said viscous transmission provides torque transfer to one side shaft.

3. The torque distribution device of claim 2 wherein said second side shaft is driven with said same torque via said rear differential.

4. The torque distribution device of claim 1 wherein a speed difference between said front and rear transaxle will create slip across said viscous transmission and generate torque.

5. The torque distribution device of claim 4 wherein said slip across said viscous transmission is approximately twice said speed difference between said front and rear differential.

6. The torque distribution device of claim 1 wherein said viscous transmission runs in axle oil.

7. The torque distribution device of claim 6 wherein said axle oil minimizes efforts for bearings and seals and improves cooling of said viscous transmission.

8. The torque distribution device of claim 1 wherein said viscous transmission is partially filled with a highly viscous oil.

* * * * *